United States Patent
Kittichokechai et al.

(10) Patent No.: US 11,133,889 B2
(45) Date of Patent: Sep. 28, 2021

(54) NETWORK NODE, UE AND METHODS THEREIN FOR DETECTING A DAMAGED TRANSMISSION OF DATA DUE TO DATA PUNCTURING

(71) Applicant: Telefonaktiebolaget LM Ericsson (publ), Stockholm (SE)

(72) Inventors: Kittipong Kittichokechai, Järfälla (SE); Niklas Andgart, Södra Sandby (SE); Alexey Shapin, Luleå (SE); Mårten Sundberg, Årsta (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/485,508

(22) PCT Filed: Mar. 14, 2018

(86) PCT No.: PCT/SE2018/050246
§ 371 (c)(1),
(2) Date: Aug. 13, 2019

(87) PCT Pub. No.: WO2018/174780
PCT Pub. Date: Sep. 27, 2018

(65) Prior Publication Data
US 2020/0052812 A1  Feb. 13, 2020

Related U.S. Application Data

(60) Provisional application No. 62/476,709, filed on Mar. 24, 2017.

(51) Int. Cl.
*H04L 1/00* (2006.01)
*H04L 1/18* (2006.01)
*H04L 5/00* (2006.01)

(52) U.S. Cl.
CPC .......... *H04L 1/0013* (2013.01); *H04L 1/0003* (2013.01); *H04L 1/1819* (2013.01); *H04L 1/1845* (2013.01); *H04L 5/0055* (2013.01)

(58) Field of Classification Search
None
See application file for complete search history.

(56) References Cited

U.S. PATENT DOCUMENTS

2003/0185242 A1* 10/2003 Lee ................. H04L 1/1671
  370/491
2008/0298387 A1* 12/2008 Lohr ............... H04L 1/1671
  370/467

OTHER PUBLICATIONS

3RD Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.0.0, Sep. 1, 2016, pp. 1-96, 3GPP.

(Continued)

*Primary Examiner* — Kouroush Mohebbi
(74) *Attorney, Agent, or Firm* — Coats & Bennett, PLLC

(57) ABSTRACT

A method performed by a network node for handling a damaged transmission of data due to data puncturing is provided. The network node receives (201), from a User Equipment, (UE) a Negative Acknowledgment (NACK) feedback of a previous transmission of data transmitted to the UE. The network node checks (202) whether or not the data is punctured in the previous transmission corresponding to the NACK feedback. When the data is punctured in the previous transmission, the network node selects (203) a Redundancy Version (RV), for a retransmission of the data, according to characteristics of the punctured data and punc- (Continued)

---

201. Receive, from UE, a NAC, feedback of a previous transmission of data, transmitted to the UE.

202. Check whether data is punctured in the previous transmission corresponding to the NACK feedback.

203. When data is punctured in previous transmission, select an RV for retransmission of the data, according to characteristics of punctured data and puncturing data.

204. Send PI, selected RV and retransmission of the data to the UE.

turing data. The network node then sends (204) a Puncturing Indication (PI), the selected RV and the retransmission of the data to the UE.

17 Claims, 7 Drawing Sheets

(56) References Cited

OTHER PUBLICATIONS

Ericsson, "Discussion on URLLC Puncturing of Data", 3GPP TSG RAN WG1 AH_NR Meeting, Spokane, USA, Jan. 16, 2017, pp. 1-4, R1-1700688, 3GPP.
Sequans Communications, "On Dynamic Resource Sharing Between URLLC and eMBB in DL", 3GPP TSG RAN WG1 AH_NR Meeting, Spokane, USA, Jan. 16, 2017, pp. 1-6, R1-1700642, 3GPP.
LG Electronics, "Discussion on Multiplexing of eMBB and URLLC for Downlink", 3GPP TSG RAN WG1 Meeting #88, Athens, Greece, Feb. 13, 2017, pp. 1-7, R1-1702488, 3GPP.

\* cited by examiner

NETWORK NODE, UE AND METHODS THEREIN FOR DETECTING A DAMAGED TRANSMISSION OF DATA DUE TO DATA PUNCTURING

TECHNICAL FIELD

The application relates to methods and apparatus for detecting and mitigating the effects of data transmission puncturing in wireless communication systems.

Embodiments herein relate to a network node, a User Equipment (UE) and methods therein. In particular, they relate to handling and detecting a damaged transmission of data due to data puncturing.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

5G NR is envisioned to support new data traffic which requires Ultra-High Reliability and Low Latency (URLLC). To support low latency requirement, URLLC data may be transmitted in a mini-slot embedded in the regular NR slot structure. The transmission of mini slots may be multiplexed with regular slot level transmission based on normal scheduling procedure. However, with ultra-low latency requirement, it is possible that a mini-slot transmission containing, e.g., URLLC or high priority data, will happen during the ongoing slot level transmission, which may contain a large volume of eMBB data, and overlap with the resources already scheduled for eMBB data. We refer to this scenario as puncturing.

An important part of the LTE HARQ is the use of soft combining, which implies that the receiver combines the received signal from multiple transmission attempts. When using soft combining, the erroneously received packet is stored in a buffer memory and is later combined with one or several retransmissions. The decoder is operating on the combined soft buffer, thereby producing a more reliable output than if only a single transmission would have been used.

HARQ with soft combining is typically based on Incremental Redundancy (IR), which includes Chase combining (CC) as a special case. Incremental Redundancy when used herein means that different redundancy versions, e.g., different sets of coded bits are used for the retransmission than the previous transmission. With Chase combining HARQ exactly the same coded bits are used for the first transmission and the retransmission. With IR, each retransmission may be different to the previous transmission, but all retransmissions represent the same information bits. Whenever a retransmission is needed, the retransmission typically uses a different set of coded bits than the previous transmission. The receiver combines the soft information of the first transmission with the soft information of the retransmission. If exactly the same coded bits are used for the first transmission and the retransmission, i.e. Chase combining, the combined soft information corresponds to a codeword with the same length as the first transmission. If any bits that were not part of the first transmission are included in the retransmission, the combined soft information corresponds to a longer codeword with lower code rate. In LTE, the (re)transmissions and IR is based on a circular buffer together with different Redundancy Versions (RV). RV when used herein means a set of coded bits representing the same set of information bits where different RVs are generated by puncturing the output of the encoder. An LTE turbo code is a systematic code of rate 1/3, i.e. ⅓ of the coded bits are systematic bits, or information bits, and ⅔ of the bits are parity bits. A codeword, after sub-block interleaving, $[s_0, s_1, \ldots, s_{k-1}, p_0^1, p_0^2, \ldots, p_{k-1}^1, p_{k-1}^2]$ is put into a circular buffer. Each RV indicates a starting point in the circular buffer. To generate n bits of redundancy version T, n bits are read clock-wise from the circular buffer, starting at the position indicated by RV T and wrapping around to $s_0$ if the end of the codeword is reached. The number of bits n to be transmitted can be determined from the scheduling information.

The above description focuses on the existing LTE mechanisms, but the relevant parts are also true for the new NR standard as well. In particular
- The LDPC codes in NR support IR HARQ in a similar way as the LTE Turbo codes.
- Rate matching based on a circular buffer is supported in NR.

When data puncturing occurs, e.g., mini-slot puncturing regular slot level transmission, it may significantly degrade performance of the regular slot level. This will be more explained below.

SUMMARY

An object of embodiments herein is therefore to improve the performance of a wireless communications network using puncturing.

According to a first aspect of embodiments herein, the object is achieved by a method performed by a network node for handling a damaged transmission of data due to data puncturing. The network node receives, from a User Equipment, UE, a Negative Acknowledgment, NACK, feedback of a previous transmission of data transmitted to the UE 102. The network node checks whether or not the data is punctured in the previous transmission corresponding to the NACK feedback. When the data is punctured in the previous transmission, the network node selects a Redundancy Version, RV, for a retransmission of the data, according to characteristics of the punctured data and puncturing data. The network node then sends a Puncturing Indication, PI, the selected RV and the retransmission of the data to the UE.

According to a second aspect of embodiments herein, the object is achieved by a method performed by a User Equipment, UE, for detecting a damaged transmission of data due to data puncturing. The UE receives from a network node, a retransmission of data of a previous transmission transmitted to the UE by the network node, a Puncturing Indication, PI, and a Redundancy Version, RV, for the retransmission. The UE checks the PI, whether or not the data is punctured in the previous transmission of data. When the data is punctured in the previous transmission, the UE detects the puncturing data based on the RV.

According to a third aspect of embodiments herein, the object is achieved by a network node for handling a damaged transmission of data due to data puncturing. The network node is configured to:
Receive from a User Equipment, UE, a Negative Acknowledgment, NACK, feedback of a previous transmission of data, transmitted to the UE,
check whether or not the data is punctured in the previous transmission corresponding to the NACK feedback,
when the data is punctured in the previous transmission, select a Redundancy Version, RV, for a retransmission of the data, according to characteristics of the punctured data and puncturing data, and
send a Puncturing Indication, PI, the selected RV and the retransmission of the data to the UE. According to a forth aspect of embodiments herein, the object is achieved by a User Equipment, UE, for detecting a damaged transmission of data due to data puncturing. The UE is configured to:
Receive from a network node, a retransmission of data of a previous transmission transmitted to the UE by the network node, a Puncturing Indication, PI, and a Redundancy Version, RV, for the retransmission,
check the PI whether or not the data is punctured in the previous transmission of data, and
when the data is punctured in the previous transmission, detect the puncturing data based on the RV.

The use of an PI together with RV provided together with the retransmission, allows the UE to efficiently detect the corrupted data, i.e. the punctured data among the rest of the transmitted data and clear it before combining with the retransmission. Embodiments herein therefore increases the likelihood of successful decoding at the UE, and may decrease the required number of retransmissions, which results in an improved performance of a wireless communications network using puncturing.

BRIEF DESCRIPTION OF THE DRAWINGS

Examples of embodiments herein are described in more detail with reference to attached drawings in which.

DETAILED DESCRIPTION

Figure 1:
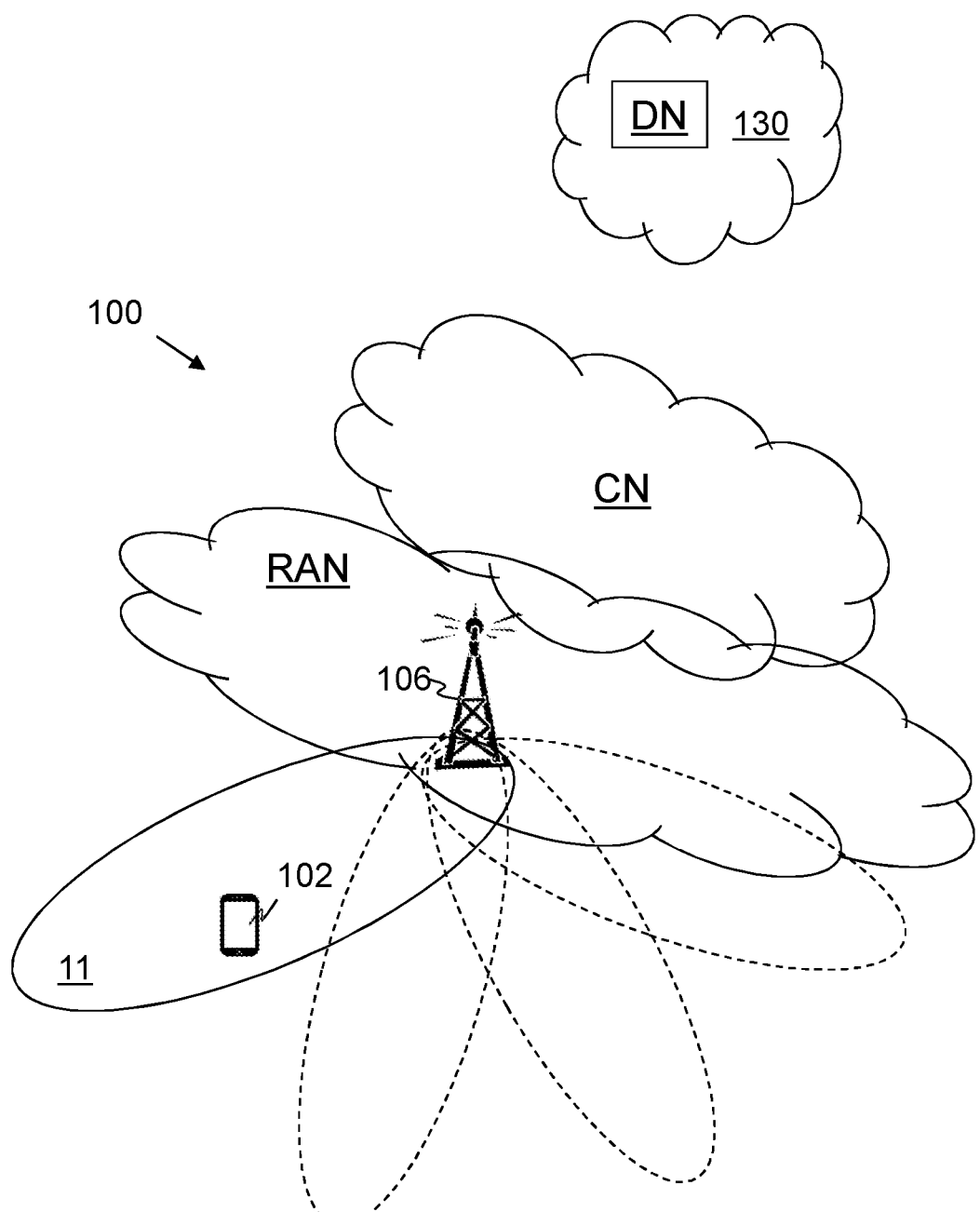
FIG. 1 is a schematic block diagram depicting embodiments of a wireless communications network.

As a part of developing embodiments herein a problem will first be identified and discussed. As mentioned above, when data puncturing occurs, e.g., mini-slot puncturing regular slot level transmission, it can significantly degrade performance of the regular slot level transmission. This may be the case if the receiver of slot transmission is unaware of it. For example, it can affect the probability of successful decoding of the regular slot transmission. Moreover, it can affect the probability of successful HARQ retransmission if the corrupted information due to puncturing is used to soft combine with that of the retransmission.

When a transmission is severely damaged, for example by mini-slot puncturing such as e.g. URLLC, SRS, etc., or by strong interference, the chance of successful decoding is low. Moreover, the corrupted soft information is kept in the soft buffer. When a retransmission is received, the new soft information is combined with the corrupted soft information from the previous transmission attempt. This may result in decoding failure even after receiving a correct retransmission.

Therefore, there should be some form of indication to the receiver to allow it to detect and clear the corrupted information.

In cases when a transmission is severely damaged, for example a slot transmission punctured by a mini-slot transmission, it is assumed that the specification would allow for an indication of the puncturing according to embodiments herein. In order to minimize the impact on specification and product implementation, it is further assumed that the Puncturing Indication (PI) according to embodiments herein is signaled to the UE by implicit or explicit signaling in the retransmission. The puncturing would in this case indicate that the previous transmission (not the one where PI is signaled) was fully or partially punctured.

It should be noted that the wording "data puncturing" may also be referred to as "data preemption".

According to embodiments herein, the combination of the PI together with a signaled RV is used by the UE to detect the punctured resources such as the puncturing data in a previous transmission. The means to detect the resources depend on the state of the PI and RV. By using appropriate detection methods based on the state of the PI and RV for the respective case, the corrupted soft information due to the puncturing data may be detected and removed from the buffer by the UE. In cases of mini slot containing URLLC data puncturing into eMBB resources, specific combinations of PI and RV may correspond to different characteristic of eMBB and URLLC data as well as detection solutions at the UE.

If a transmission is severely damaged for example by puncturing the transmission, i.e. by replacing the transmitted symbols by other symbols intended for another, or the same UE, or by strong interference, the receiving node, e.g. the UE, gets corrupted data in its soft buffer. The transmitter, e.g. the gNB, may command the receiver to delete the whole soft buffer of the corresponding HARQ process when retransmitting the data. However, some parts of the received data corresponding to the same codeword in the soft buffer may be uncorrupted. The use of an indication, such as PI, together with RV field provided by embodiments herein, allows the receiving node to detect efficiently only the corrupted data, i.e. the punctured data among the rest of the transmitted data and clear it before combining with a new transmission, such as a retransmission. It therefore increases the likelihood of successful decoding at the receiving node and may decrease a required number of retransmissions. In some cases, a transmission from a gNB to a UE may be severely damaged, for example by puncturing the transmission, i.e. by replacing the transmitted symbols by other symbols intended for another, or the same UE, or by strong interference. The puncturing may for example be URLLC or SRS puncturing eMBB.

In these cases, the puncturing indicator (PI) in a retransmission can be used to signal that puncturing has occurred in the previous transmission. A combination of PI and RV such as e.g. PI and RV field, allows the UE to perform appropriate puncturing detection of the damaged transmission where different RV values can
imply the characteristics of eMBB and URLLC data, and
be used to infer different detection methods at the UE.
With successful detection of punctured resources according to embodiments herein, soft-information for the damaged transmission may then be removed from the soft-buffer before further processing, such as e.g., soft combining.

Embodiments herein relate to wireless communication networks in general. FIG. 1 is a schematic overview depicting a radio communications network 100. The radio communications network 100 comprises one or more RANs and one or more CNs. The radio communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. a UE 102 such as a mobile station, a non-access point (non-AP) STA, a STA, and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

A network node 106 operates in the radio communications network 100. The network node 106, which also may be referred to as a network device 106, provides radio coverage over a geographical area, a service area 11, which may also be referred to as a beam or a beam group of a first radio access technology (RAT), such as 5G, LTE, Wi-Fi or similar. The network node 106 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a 5G NodeB (gNB, gNodeB), a base transceiver station, a radio remote unit, an Access Point Base Station, a base station router, a transmission arrangement of a radio base station, a stand-alone access point or any other network unit capable of communicating with a wireless device within the service area served by the network node 106 depending e.g. on the first radio access technology and terminology used. The network node 106 may be referred to as a serving radio network node and communicates with the UE 102 with Downlink (DL) transmissions to the UE 102 and Uplink (UL) transmissions from the UE 102.

Methods described herein may be performed by the network node 106. As an alternative, a Distributed Node (DN) and functionality, e.g. comprised in a cloud 130 as shown in FIG. 1, may be used for performing or partly performing the methods.

Figure 2:
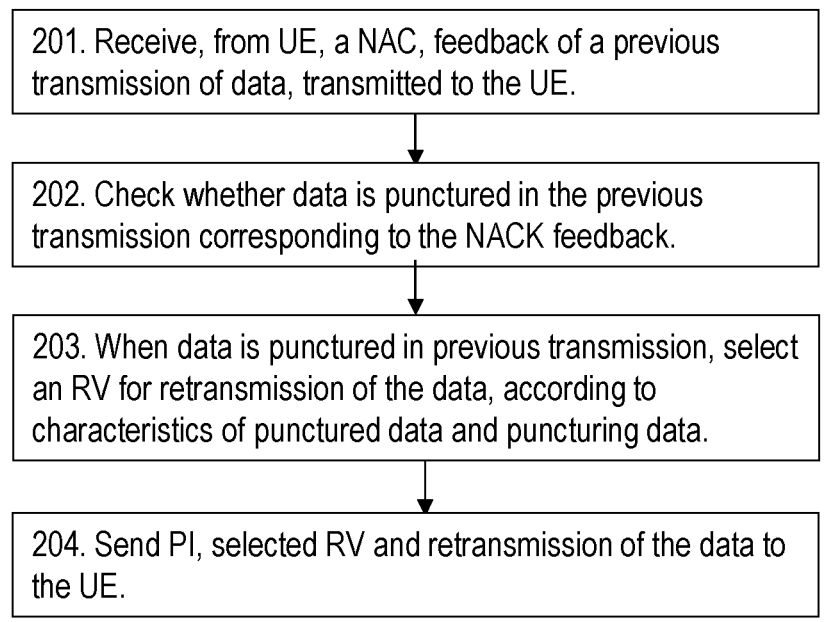
FIG. 2 is a flowchart illustrating embodiments of method in a network node.

Example embodiments of a method performed by the network node 106 for handling a damaged transmission of data due to data puncturing is depicted in FIG. 2. Methods in the network node 106 and the UE 102 will first be described in a general way, followed by explanations with more details. The method in the network node 106 comprises one or more of the following actions which actions may be taken in any suitable order. Actions that are optional are presented in dashed boxes in FIG. 2.

Action 201

The network node 106 receives a Negative Acknowledgment (NACK) feedback of a previous transmission of data from the UE 102. The previous transmission of data is transmitted by the network node 106 to the UE 102.

Action 202

The network node 106 checks whether or not the data is punctured in the previous transmission corresponding to the NACK feedback. This may be detected by using known information at the network node 106 on whether and which part of the previous transmission was punctured, and if so whether the punctured part corresponds to the NACK feedback.

Action 203

When the data is punctured in the previous transmission, the network node 106 selects a Redundancy Version (RV) for a retransmission of the data, according to characteristics of the punctured data and puncturing data. The characteristics of the respective puncturing data and punctured data may e.g. comprise any one or more out of modulation scheme and power.

When the puncturing data and the punctured data have the same characteristics, the selecting of the RV may comprise: Selecting the RV to be an RV that in terms of bit positions partially or fully overlaps with the RV used in the previous transmission. This may e.g. be the same RV as the one used in the previous transmission. In some of these embodiments, the RV is selected so that the overlapping part to a large extent coincides with the punctured part of the previous transmission. Selecting the same or almost the same RV for the retransmission compared to the previous transmission makes it possible for the UE 106 to use Algorithm 1 for detecting the puncturing data in a retransmission. Algorithm 1 will be explained below.

When the puncturing data and the punctured data have different characteristics, the selecting of the RV may comprise: Selecting the RV to maximize coding gain. This may e.g. imply a different RV as the one used in the previous transmission. Selecting a different RV for the retransmission compared to the previous transmission makes it possible for the UE 106 to use Algorithm 2 for detecting the puncturing data in the retransmission. Algorithm 2 will be explained below. In some of these embodiments, the network node 106 relies on the UE 102 to detect the differences of the characteristics of the puncturing data and the punctured data. The UE 102 may e.g. use some algorithms to detect modulation inconsistencies or power inconsistencies to detect the differences of the characteristics of the puncturing data and the punctured data.

Action 204

When sending the retransmission, the network node 106 will inform the UE about the punctured data in the previous transmission by sending a Puncturing Indication (PI) and indicate how to detect the puncturing data in the previous transmission by sending the selected RV. Thus the network node 106 sends the PI, the selected RV and the retransmission of the data to the UE 102. In some embodiments, the retransmission uses the selected RV. The PI may e.g. be any one out of: An explicit indication in Downlink Control Information (DCI) and implicitly inferred, also referred to as an implicit indication.

Figure 3:
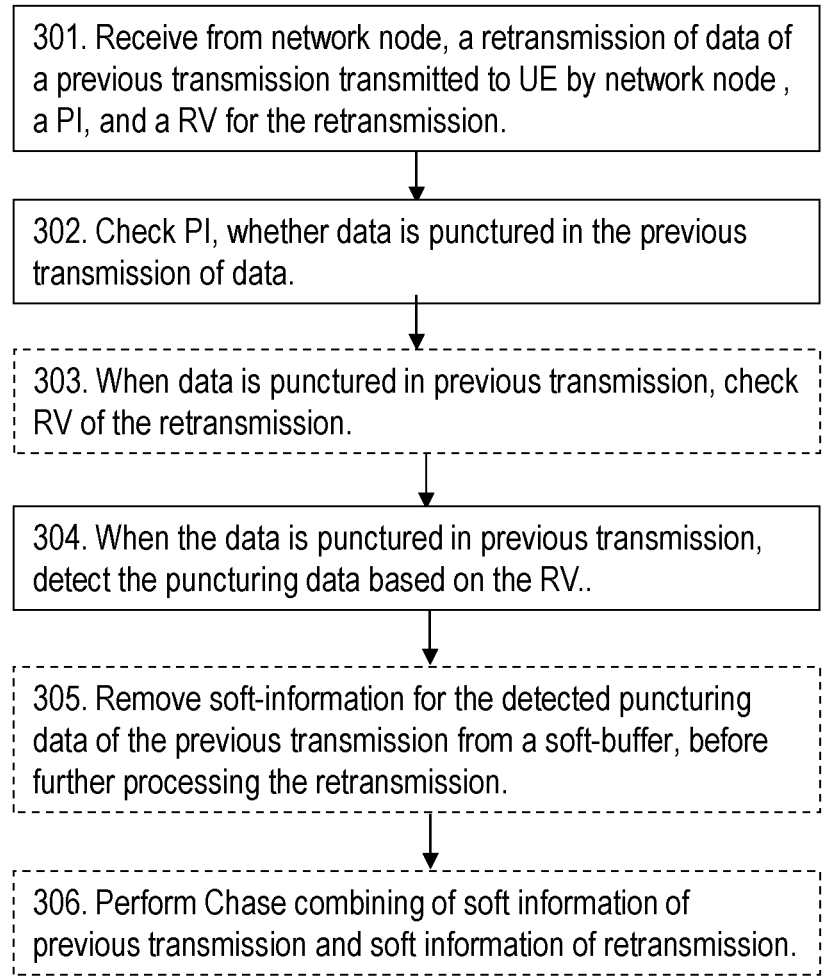
FIG. 3 is a flowchart illustrating embodiments of method in a UE.

Example embodiments of a method performed by the UE 102 for detecting a damaged transmission of data due to data puncturing, is depicted in FIG. 3. The method comprises one or more of the following actions which actions may be taken in any suitable order. Actions that are optional are presented in dashed boxes in FIG. 3.

Action 301

The UE 102 receives from the network node 106, a retransmission of data of a previous transmission, a PI and a RV for the retransmission. The previous transmission is transmitted to the UE 102 by the network node 106. As mentioned above, the received RV if correctly received may be used in the retransmission.

The PI may be any one out of an explicit indication in downlink control information, DCI, and implicitly inferred.

Action 302

The UE 102 checks the PI, whether or not the data is punctured in the previous transmission of data.

Action 303

In some embodiments, when the data is punctured in the previous transmission, the UE 102 may check the RV of the retransmission.

Action 304

When the data is punctured in the previous transmission, the UE 102 detects the puncturing data based on the RV.

If the RV in terms of bit positions partially or fully overlaps with the RV used in the previous transmission as mentioned above, e.g. if the same RV is used in the retransmission as in the previous transmission, the UE 102 may perform the detecting of the puncturing data by using a correlation in characteristics between the previous transmission and the retransmission, also referred to as Algorithm 1, which will be described below.

If a different RV is used in the retransmission compared to the previous transmission, the UE 102 may perform the detecting of the puncturing data by using a difference in characteristics between the puncturing data and the punctured data in the previous transmission, also referred to as Algorithm 2, which will be described below.

The puncturing data and punctured data may have different characteristics. In this case the detecting of the puncturing data may be performed by detecting the differences of the different characteristics of the puncturing data and the punctured data.

The characteristics of the respective puncturing data and punctured data may comprise any one or more out of: modulation scheme and power.

Action 305

In some embodiments, the UE 102 removes soft-information for the detected puncturing data of the previous transmission from a soft-buffer, before further processing the retransmission.

Action 306

In some embodiments as mentioned above, the UE 102 has checked the RV of the retransmission when the data is punctured in the previous transmission.

If the same RV is used in the retransmission as in the previous transmission, the UE 102 may in these embodiments perform soft combining, e.g. Chase combining, of soft information of the previous transmission and soft information of the retransmission. This may be referred to as Algorithm 1+Chase combining below. If it is the case that RV in terms of bit positions partially overlaps, meaning that different RV is used and the combining is not Chase combining anymore.

The performing of the soft combining, e.g. Chase combining of soft information of the previous transmission and soft information of the retransmission may in these embodiments be performed after the detected puncturing data is removed from the soft buffer.

If a different RV is used in the retransmission compared to the previous transmission, the UE 102 may in these embodiments perform the soft combining of soft information of the previous transmission and soft information of the retransmission based on Incremental Redundancy (IR). This may be referred to as Algorithm 2+soft combining below.

The performing of the soft combining of soft information of the previous transmission and soft information of the retransmission may in these embodiments be performed after the detected puncturing data is removed from the soft buffer.

Embodiments herein will now be further described and exemplified. The text below is applicable to and may be combined with any suitable embodiment described above.

Puncturing Scenarios

Two puncturing scenarios may be considered.

1) In a first puncturing scenario, the punctured data, such as the eMBB data, and the puncturing data use the same or similar modulation scheme, power, and other characteristics. Puncturing detection may in this scenario, be done based on a retransmission of the same RV or different RV by comparing overlapping bits of the different transmissions. This means that both the first transmission and the retransmission will be used for puncturing detection. The detection algorithm may for example be based on correlation of the two transmissions using the overlapped parts.

The detection algorithm selected for this case is referred to as Algorithm 1.

Algorithm 1: Puncturing and punctured data have the same characteristic. The same RV (or different RV but with most overlapped bit position) is used for the retransmission. The algorithm 1 uses both previous transmission and the retransmission to do puncturing detection based on for example correlation between previous and retransmission.

2) In a second puncturing scenario, the punctured data, such as the eMBB data and puncturing data use different modulation schemes, power, or other characteristics. In this second puncturing scenario, the difference in characteristic between the punctured data and the puncturing data such as the eMBB and the URLLC data may be used for detection.

The detection algorithm selected for this case is referred to as Algorithm 2.

Algorithm 2: Puncturing and punctured data have different characteristics. Different RV is used for the retransmission. The algorithm 2 uses only the previous transmission to do puncturing detection by detecting the difference in signal characteristics of the previous transmission. (The retransmission is used for combining later on.)

Example of gNB, Such as e.g. the Network Node 106, Related Implementation for Puncturing Preparation of Puncturing Transmission into an eMBB Transmission At the point of preparing for a puncturing transmission into a data transmission such as an eMBB transmission, the gNB, such as e.g. the network node 106, may set the transmission parameters in such a way that the requirements for the puncturing transmission is fulfilled. At the same time the preparation of the ongoing data transmission such as the eMBB transmission should be aided. Knowing the transmission properties of the ongoing data transmission, the gNB, such as e.g. the network node 106, may set the parameters of the puncturing transmission such that the condition 2 above is fulfilled. Condition 2 relates to the second puncturing scenario mentioned earlier where the punctured data and puncturing data have different characteristics such as different modulation schemes, powers, etc. The target of the gNB, such as e.g. the network node 106, should be to set the parameters for the ongoing punctured transmission and the puncturing transmission such that UE 102 can distinguish between the two transmissions, and that a different RV may be used for the retransmission to improve HARQ performance. This may be since using different RV for the retransmission can provide additional coding and combining gain compared to using the same RV.

The options below to select modulation, beamforming and power aim to introduce differences in signal characteristics between puncturing and punctured data if possible so that the UE 102 can differentiate the puncturing data from the punctured data and in that way detect the and identify the puncturing data. This may be done for example at Physical Downlink Control Channel (PDCCH) or Physical Downlink Shared Channel (PDSCH) or both, of the puncturing transmission.

Selecting Modulation

The gNB, such as the network node 106, schedules by selecting a modulation such that the modulation of the puncturing transmission is different from the punctured transmission, if possible within link adaptation and resource constraints. This is to facilitate puncturing detection at the UE 102 without affecting the performance intended by the link adaptation and scheduling algorithms.

For a Modulation Coding Scheme (MCS) close to boundaries between modulation orders, the selecting of modulation may be done without much change in effective code rate. E.g. a 16 Quadrature Amplitude Modulation (QAM) modulation with a higher code rate may carry the same information as a 64 QAM modulation with lower code rate.

Selecting Beamforming and Power

The gNB, such as the network node 106, may schedule the data transmission such that the received power per symbol of the puncturing transmission is substantially different, such that condition 2 is fulfilled, i.e., the punctured data and puncturing data have different characteristics in terms of power. As an example, the puncturing data may be scheduled on resources used by a UE such as the UE 102 with significantly different beam characteristics, ensuring that the received power of the punctured part is lower. This is to ensure that the punctured data and puncturing data have different characteristics. As another example, power boosting may be used on the puncturing resources to ensure coverage and fulfill condition 2, i.e. the punctured data and puncturing data have different characteristics. Puncturing resources when used herein means the resources used by the puncturing data.

gNB Such as Network Node 106 Related Implementation for Retransmission

Consider a DL transmission scenario when puncturing occurred, i.e. when the DL data transmission sent from the network node 106 is punctured by puncturing data. The receiving node such as the UE 102 cannot decode the data successfully, e.g. sends a NACK to the network node 106 and requests for a retransmission. Embodiments herein specify retransmission behavior at the gNB such as the network node 106 and provide the use of a combination of PI and RV to indicate the puncturing event with extra information on signal characteristic.

Retransmission Steps (after Receiving NACK Feedback)

1) First, the gNB such as the network node 106 checks whether puncturing has occurred in the previous transmission or parts of the transmission that correspond to the NACK feedback, i.e. whether or not the data is punctured in the previous transmission corresponding to the NACK feedback.

a) If puncturing did not occur, it proceeds as usual by retransmitting the data using either the same or different RV.

b) If puncturing occurred in the previous transmission, i.e. if the data is punctured in the previous transmission, the gNB such as the network node 106, sends a PI and selects RV of the retransmission according to the characteristic of puncturing data and the punctured data such as the eMBB data, e.g., i) When puncturing data and the punctured data such as the eMBB data have the same characteristic, e.g., modulation scheme, power, etc., the gNB such as the network node 106 selects the RV to be one that in terms of bit positions partially or fully overlaps, (the same RV) with the one used in the previous transmission. In other words, the network node 106 selects the RV such that the selected RV in terms of bit positions partially or fully overlaps, with the RV used in the previous transmission. Specifically, the RV of the retransmission should be selected so that the overlapping parts of the bit positions of the RV of the previous transmission and RV of the retransmission to a large extent coincides with the punctured part of the previous transmission. In this way the receiving node can make use of differences between the transmissions, instead of between signal characteristics to detect a puncturing event.

ii) When puncturing data and the punctured data such as the eMBB data have different characteristics, e.g., modulation scheme, power, etc., the gNB such as the network node 106 may rely on the receiving node which for example is the UE 102 to detect the differences and select the RV freely to maximize coding gain.

2) The PI and RV may then be conveyed to the UE 102 to imply the puncturing event and to provide information regarding characteristics of puncturing data and the punctured data such as the eMBB data.

Note that the PI may be an explicit indication in DCI or may be an implicit indication, i.e. implicitly inferred from some existing field or a combination of existing fields, e.g., a combination of New Data Indicator (NDI) and RV.

In a case where PI is implicitly inferred from a combination of NDI and RV, the following may be done, e.g., when previous puncturing data and punctured data such as eMBB data have the same characteristic, such as e.g., modulation scheme, power, etc.

In this case, use a combination of NDI and RV for PI where the same RV as in the previous transmission is used, but preferably, RVQ≠0.

In a case where the previous puncturing data and the punctured data such as the eMBB data have different characteristics, such as e.g., modulation scheme, power, etc., the following may be done:

So in this case, use a combination of NDI and RV for PI where an RV that is different from the previous transmission is used, but preferably, RV≠0.

UE Related Implementation

Consider a DL transmission scenario when data puncturing occurred. The receiving node, such as the UE 102 cannot decode data successfully and requests the network node 106 for a retransmission. After receiving a retransmission, there are alternatives considered for the UE 102 to use a combination of PI and RV to infer different detection methods of punctured resources.

Receiver Processing Steps (after Receiving the Retransmission)

1) First the UE 102 checks the PI to see whether puncturing has occurred in the previous transmission.
   a) If there was no puncturing in the previous transmission, the UE 102 processes the received retransmission as usual, i.e., combining previous soft information in the soft buffer with the new soft information from retransmission.
   b) If there was puncturing in the previous transmission, the UE 102 checks RV of the retransmission.
     i) If the RV in terms of bit positions partially or fully overlaps with the RV used in the previous transmission as mentioned above, e.g. if the same RV is used in the retransmission as in the previous one, the UE 102 performs puncturing detection using Algorithm 1 described above such as e.g. using correlation between two transmissions, clear soft information in the soft buffer corresponding to detected region, and perform Chase combining of previous soft information and the new soft information from retransmission. If the UE 102 detected a puncturing by Algorithm 2 in the previous transmission which means that different RV may be used for the retransmission, original soft-values, not cleared, should preferably be used as input to detection Algorithm 1 if applied. This is to ensure that the soft-values corresponding to the puncturing data remain for detection using Algorithm 1.
     ii) If the RV set in the retransmission is different from that in the previous one, the UE 102 performs puncturing detection using Algorithm 2, e.g., detecting difference in signal characteristics of the previous transmission, clear soft information in the soft buffer corresponding to detected region, and perform soft combining based on incremental redundancy (IR).

In the case that PI is implicitly inferred from a combination of NDI and RV according to some embodiments, similar receiver processing steps as above may be done, e.g., When the UE 102 receives in the retransmission that NDI is toggled+same RV is used as in the previous transmission (but RV~=0))

The UE 102 performs puncturing detection using Algorithm 1+Chase combining. The NDI being toggled typically means new transmission with RV=0.

When UE receives in the retransmission that NDI is toggled+RV is different from the one in the previous transmission (but RV~=0)

The UE 102 performs puncturing detection using Algorithm 2+soft combining based on incremental redundancy (IR)

In the disclosure embodiments herein are described viewing PI and RV as two separate fields. PI and RV may also be seen as a jointly encoded field, and in this case embodiments herein may be described by assigning different gNB such as the network node 106 and UE 102 behaviors to different values of this jointly encoded field.

A retransmission may be done at a level of transport block, code block, or a group of code blocks. The use of PI and RV for puncturing detection described herein may still be applied.

Embodiments herein cover both gNB such as the network node 106 and UE 102 implementation aspects relating to handling of damaged transmission due to puncturing. It describes gNB such as the network node 106 and UE 102 behavior for retransmission and detection of the corrupted information.

PI is very likely to be used in NR to indicate to the UE 102 that the transmission is corrupted by puncturing data. The use of PI together with RV values may allow the gNB such as the network node 106 to imply different characteristics of puncturing and punctured data such as eMBB data and also allow the UE to detect the punctured resources using appropriate detection methods, increasing the likelihood of successful decoding.

Figure 4:
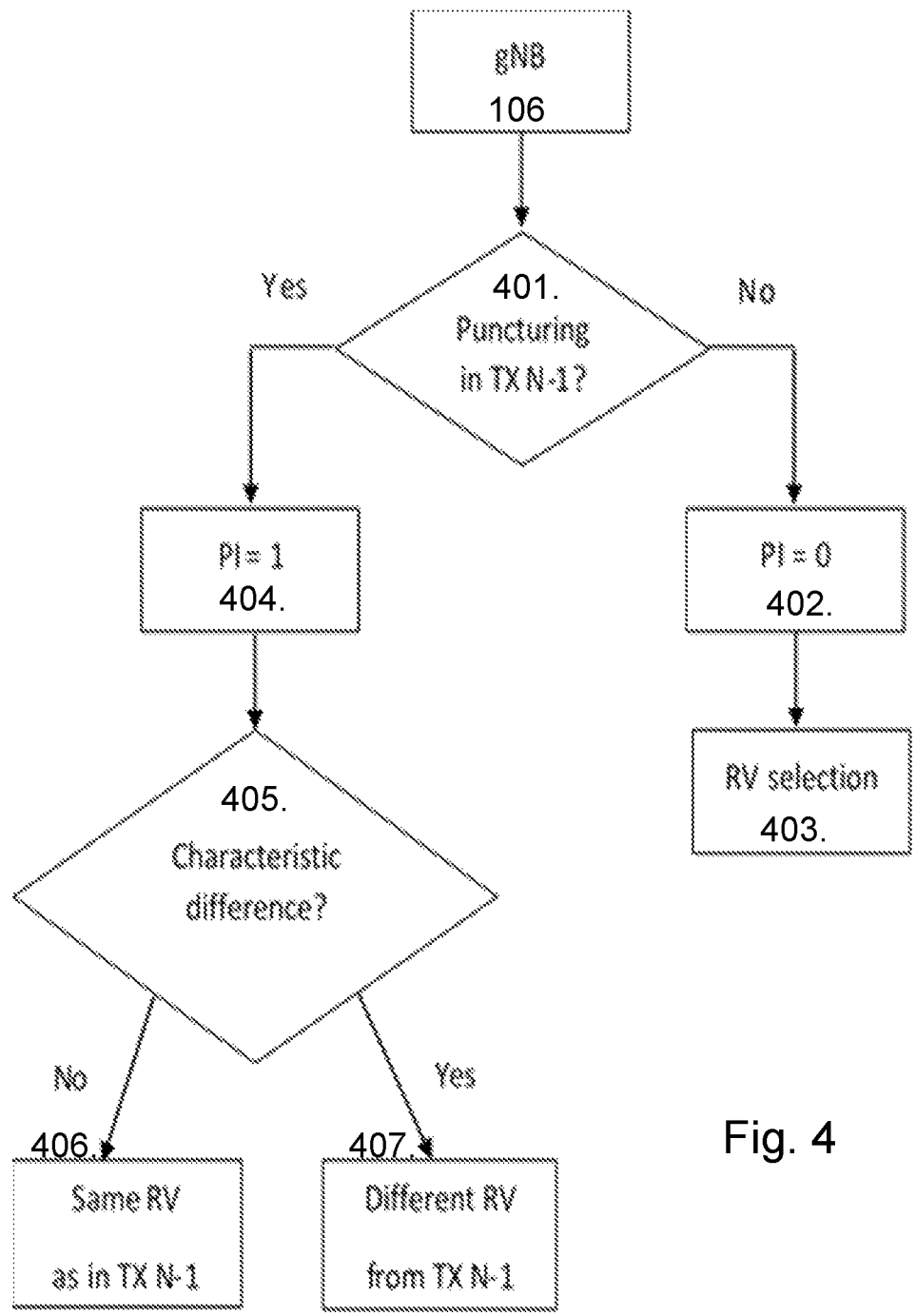
FIG. 4 is a flowchart illustrating embodiments of method in a network node.

An example of the method in the network node 106 described above is depicted in FIG. 4, wherein the network node 106 is referred to as gNB.

401. The Network node 106 has received a NACK, and checks whether or not there is any puncturing in a previous transmission TX N−1 related to the NACK.

402. In one example scenario, the Network node 106 states that there is no puncturing, i.e. Pi=0, in a previous transmission TX N−1.

403. When it is stated that there is no puncturing, i.e. Pi=0, in the previous transmission TX N−1 the network node 106 selects an RV for the retransmission as in prior art.

404. In another example scenario, the Network node 106 states that there is puncturing, i.e. Pi=1, in the previous transmission TX N−1.

405. When it is stated that there is puncturing, i.e. Pi=1, in the previous transmission TX N−1, the network node checks the puncturing data characteristics and the punctured data characteristics are different.

406. When there is no difference between the puncturing data characteristics and the punctured data characteristics, the network node 106 selects an RV for the retransmission TX N that is the same as the RV used in the previous transmission TX N−1.

407. When there is a difference between the puncturing data characteristics and the punctured data characteristics, the network node 106 selects an RV for the retransmission TX N that is different from the RV used in the previous transmission TX N−1

Figure 5:
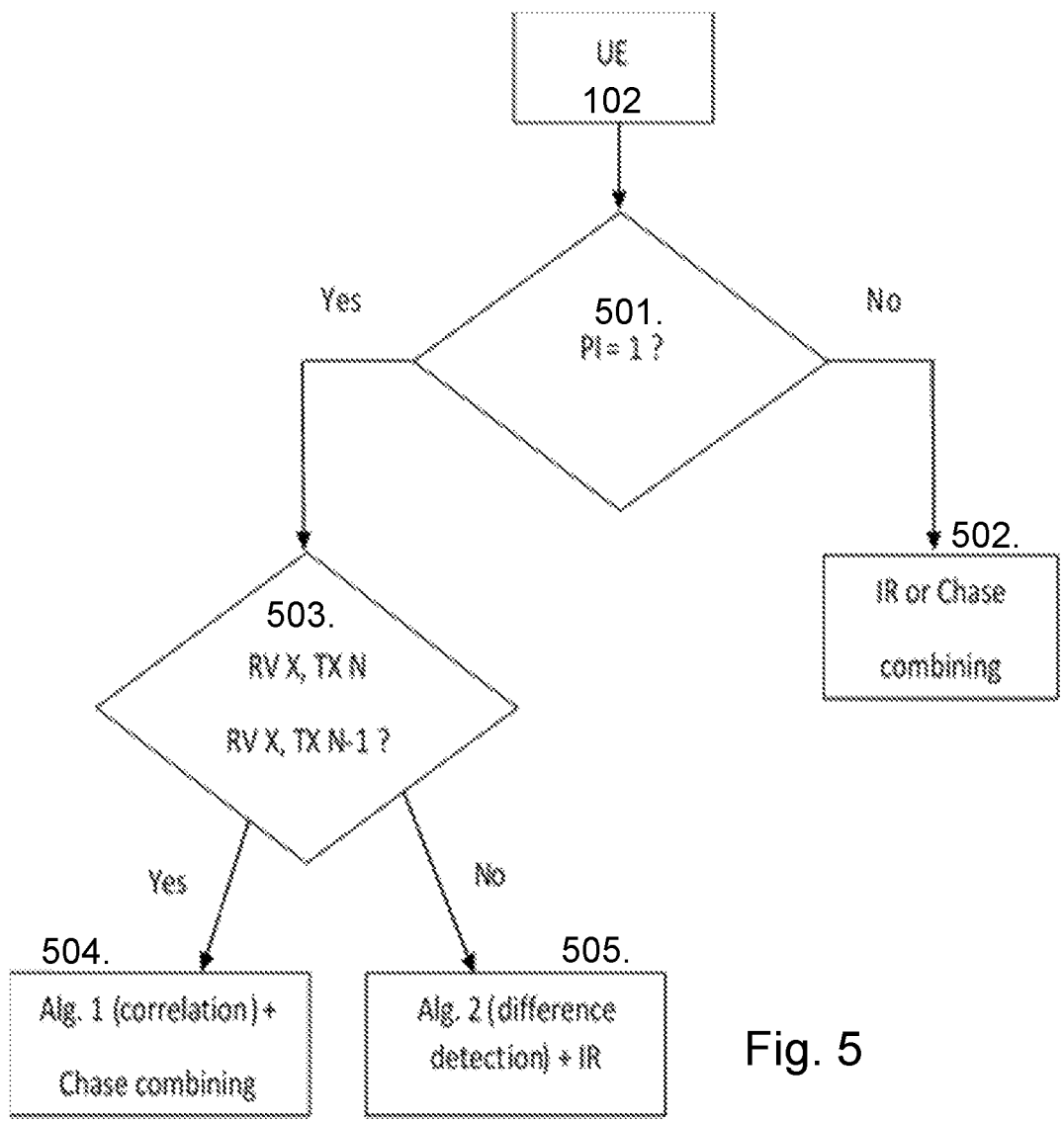
FIG. 5 is a flowchart illustrating embodiments of method in a UE.

An example of the method in the UE 102 described above is depicted in FIG. 5.

501. The UE 120 has receives a PI, an RV, and a retransmission TX N of a previous transmission TX N−1 from the network node 106. The UE 102 checks whether or not there is any puncturing in the previous transmission TX N−1.

502. If there is no puncturing, i.e. Pi=0, the UE 102 performs IR or Chase combining as in prior art.

503. If there is puncturing, i.e. Pi=1, the UE 102 checks whether RV for the retransmission TX N is the same as the RV used in the previous transmission TX N−1.

504. If the RV for the retransmission TX N is the same as the RV used in the previous transmission TX N−1, the UE 102 performs the detecting of the puncturing data by finding a correlation in characteristics between the previous transmission and the retransmission, and performs Chase combining of soft information of the previous transmission and soft information of the retransmission. I.e. the UE 102 uses Algorithm 1.

505. If RV for the retransmission TX N is different from the RV used in the previous transmission TX N−1, the UE 102 performs detecting of the puncturing data by finding a difference in characteristics between the puncturing data and the punctured data in the previous transmission, and perform soft combining of soft information of the previous transmission and soft information of the retransmission based on IR.

Figure 6A:
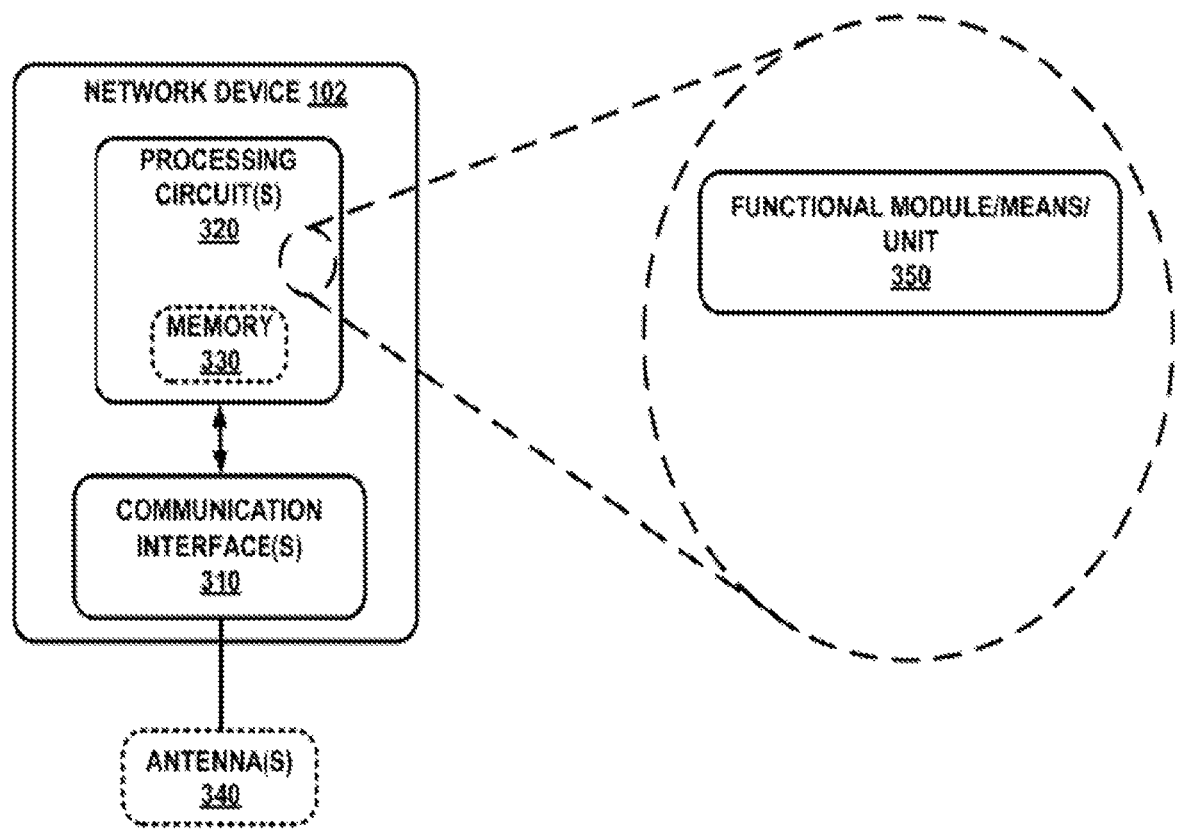
FIG. 6A is a schematic block diagram illustrating embodiments of a network node.

FIG. 6A illustrates the network device 106, which may be configured to perform any of the network-related aspects of the present solutions described above. In some is configured, e.g., via functional means or units 350, to implement processing to perform the aspects described above.

In at least some embodiments, the network node 106 also referred to as a "network device" comprises one or more processing circuits 320 configured to implement processing of the aspects of the techniques described above with respect to network-side-device aspects, such as by implementing functional means or units above. In one embodiment, for example, the processing circuit(s) 320 implements functional means or units as respective circuits. The circuits in this regard may comprise circuits dedicated to performing certain functional processing and/or one or more microprocessors in conjunction with memory 330. In embodiments that employ memory 330, which may comprise one or several types of memory such as read-only memory (ROM), random-access memory, cache memory, flash memory devices, optical storage devices, etc., the memory 330 stores program code that, when executed by the one or more for carrying out one or more microprocessors, carries out the techniques described herein.

In one or more embodiments, the network node also comprises one or more communication interfaces 310. The one or more communication interfaces 310 include various components, e.g., antennas 340 for sending and receiving data and control signals. More particularly, the interface(s) 310 include a transmitter that is configured to use known signal processing techniques, typically according to one or more standards, and is configured to condition a signal for transmission (e.g., over the air via one or more antennas 340). Similarly, the interface(s) include a receiver that is configured to convert signals received (e.g., via the antenna(s) 340) into digital samples for processing by the one or more processing circuits. The transmitter and/or receiver may also include one or more antennas 340. In an aspect, the network node 106 may correspond to any device of a radio access network, including an access point, or any network node generally, including that of a core network, or a gateway device or any intermediate device or device unaffiliated with a network explicitly.

To perform the method actions for handling a damaged transmission of data due to data puncturing, the network node 106 is configured to:

Receive, e.g. by means of a receiving unit 350, from the UE 102 a NACK feedback of a previous transmission of data, transmitted to the UE 102, check, e.g. by means of a checking unit 350, whether or not the data is punctured in the previous transmission corresponding to the NACK feedback, when the data is punctured in the previous transmission, select, e.g. by means of a selecting unit 350, a Redundancy Version, RV, for a retransmission of the data, according to characteristics of the punctured data and puncturing data, and send, e.g. by means of a sending unit 350, a Puncturing Indication, PI, the selected RV and the retransmission of the data to the UE 102.

The retransmission may be adapted to use the selected RV.

The network node 106 may be configured to select, e.g. by means of the selecting unit 350, the RV to be an RV that in terms of bit positions partially or fully overlaps with the RV used in the previous transmission which may be used in cases where the puncturing data and the punctured data have the same characteristics.

The network node 106 may be configured to select, e.g. by means of the selecting unit 350, the RV so that the overlapping part to a large extent coincides with the punctured part of the previous transmission.

The network node 106 may be configured to select, e.g. by means of the selecting unit 350, the RV to maximize coding gain, which may be used in cases where the puncturing data and the punctured data have different characteristics.

The network node 106 may further being configured to rely on the UE 102 to detect the differences of the characteristics of the puncturing data and the punctured data.

The PI may be adapted to be any one out of: an explicit indication in downlink control information, DCI, and implicitly inferred.

The characteristics of the respective puncturing data and punctured data may be adapted to comprise any one or more out of: modulation scheme and power.

Figure 6B:
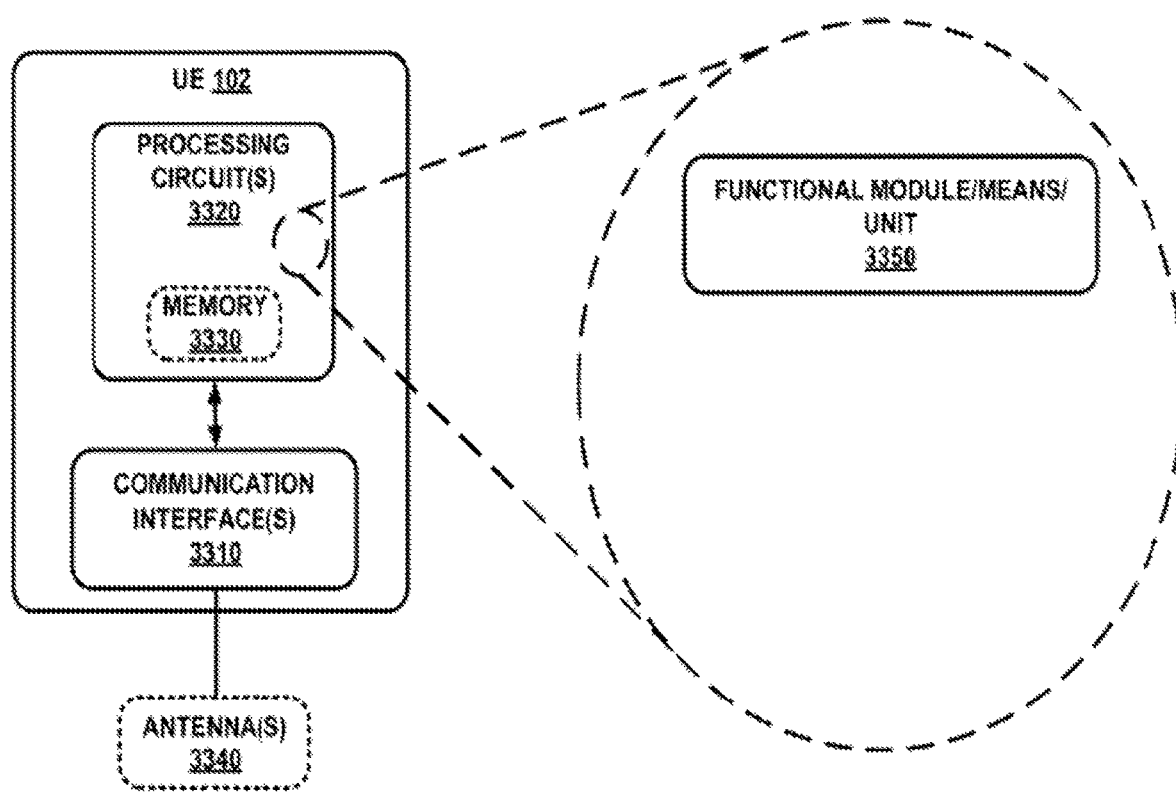
FIG. 6B is a schematic block diagram illustrating embodiments of a UE.

FIG. 6B illustrates additional details of an example of the UE 102 according to one or more embodiments. The UE 102 is configured, e.g., via functional means or units 3350, to implement processing to perform any and all of the aspects described above in reference to the UE 102.

In at least some embodiments, the user equipment comprises one or more processing circuits 3320 configured to implement processing of the UE 102 described above, such as by implementing functional means or units 3350. In one embodiment, for example, the processing circuit(s) 3320 implements functional means or units as respective circuits. The circuits in this regard may comprise circuits dedicated to performing certain functional processing and/or one or more microprocessors in conjunction with memory 3330. In embodiments that employ memory 3330, which may comprise one or several types of memory such as read-only memory (ROM), random-access memory, cache memory, flash memory devices, optical storage devices, etc., the memory 3330 stores program code that, when executed by the one or more for carrying out one or more microprocessors, carries out the techniques described herein.

In one or more embodiments, the user equipment also comprises one or more communication interfaces 3310. The one or more communication interfaces 3310 include various components (e.g., antennas 3340) for sending and receiving data and control signals. More particularly, the interface(s) 3310 include a transmitter that is configured to use known signal processing techniques, typically according to one or more standards, and is configured to condition a signal for transmission (e.g., over the air via one or more antennas 3340). Similarly, the interface(s) include a receiver that is configured to convert signals received (e.g., via the antenna(s) 3340) into digital samples for processing by the one or more processing circuits. The transmitter and/or receiver may also include one or more antennas 3340. In an aspect, the user equipment may correspond to any mobile (or even stationary) device that is configured to receive/consume user data from a network-side infrastructure, including laptops, phones, tablets, IoT devices, etc.

To perform the method actions for detecting a damaged transmission of data due to data puncturing, the UE 102 is configured to:

Receive, e.g. by means of a receiving unit 3350, from the network node 106, a retransmission of data of a previous transmission transmitted to the UE 102 by the network node 106, a PI and an RV for the retransmission, Check e.g. by means of a checking unit 3350, the PI whether or not the data is punctured in the previous transmission of data, and when the data is punctured in the previous transmission, detect, e.g. by means of a detecting unit 3350, the puncturing data based on the RV.

The received RV may be adapted to be used in the retransmission.

The UE 102 may further being configured to remove, e.g. by means of a removing unit 3350, soft-information for the detected puncturing data of the previous transmission from a soft-buffer, before further processing the retransmission.

The UE 102 may further being configured to:

When the data is punctured in the previous transmission, check, e.g. by means of the checking unit 3350, the RV of the retransmission, if the same RV is used in the retransmission as in the previous transmission, perform e.g. by means of a performing unit 3350, the detecting of the puncturing data by using a correlation in characteristics between the previous transmission and the retransmission, and perform e.g. by means of the performing unit 3350, soft combining, e.g. Chase combining, of soft information of the previous transmission and soft information of the retransmission.

The UE 102 may further being configured to perform e.g. by means of the performing unit 3350, soft combining, e.g. Chase combining of soft information of the previous transmission and soft information of the retransmission, after the detected puncturing data is removed from the soft buffer.

The UE 102 may further being configured to:

When the data is punctured in the previous transmission, check, e.g. by means of the checking unit 3350, the RV of the retransmission, and:

If a different RV is used in the retransmission compared to the previous transmission, perform, e.g. by means of the performing unit 3350, the detecting of the puncturing data by using a difference in characteristics between the puncturing data and the punctured data in the previous transmission, and perform e.g. by means of the performing unit 3350, soft combining of soft information of the previous transmission and soft information of the retransmission based on IR.

The UE 102 may further being configured to perform e.g. by means of the performing unit 3350, soft combining of soft information of the previous transmission and soft information of the retransmission, after the detected puncturing data is removed from the soft buffer.

The puncturing data and punctured data may be adapted to have different characteristics, wherein the UE 102 further may be configured to detect, e.g. by means of the detecting unit 3350, the puncturing data by detecting the differences of the different characteristics of the puncturing data and the punctured data.

The characteristics of the respective puncturing data and punctured data may be adapted to comprise any one or more out of: modulation scheme and power.

The PI may be adapted to be any one out of: an explicit indication in downlink control information, DCI, and implicitly inferred.

Those skilled in the art will also appreciate that embodiments herein further include corresponding computer programs. A computer program comprises instructions which, when executed on at least one processor of the network node, cause the network node to carry out any of the respective processing described above. Embodiments further include a carrier containing such a computer program. This carrier may comprise one of an electronic signal, optical signal, radio signal, or computer readable storage medium. A computer program in this regard may comprise one or more code modules corresponding to the means or units described above. The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

| Abbreviations | |
|---|---|
| Abbreviation | Explanation |
| eMBB | Enhanced Mobile Broad Band |
| CC | Chase Combining |
| HARQ | Hybrid Automatic Repeat Request |
| IR | Incremental Redundancy |
| NDI | New-Data Indicator |
| PI | Puncturing Indication |
| RV | Redundancy Version |
| UE | User Equipment |
| URLLC | Ultra-Reliable Low Latency Communication |

The invention claimed is:

1. A method performed by a network node for handling a damaged transmission of data due to data puncturing, the method comprising:
receiving, from a User Equipment (UE), a Negative Acknowledgment (NACK) feedback of a previous transmission of data transmitted to the UE;
checking whether or not the data is punctured in the previous transmission corresponding to the NACK feedback;
when the data is punctured in the previous transmission, selecting a Redundancy Version (RV) for a retransmission of the data, according to characteristics of the punctured data and puncturing data; and
sending a Puncturing Indication (PI), the selected RV, and the retransmission of the data to the UE.

2. The method of claim 1, wherein the retransmission uses the selected RV.

3. The method of claim 1, wherein, when the puncturing data and the punctured data have the same characteristics, the selecting the RV comprises selecting the RV to be an RV that in terms of bit positions partially or fully overlaps with the RV used in the previous transmission.

4. The method of claim 3, wherein the RV is selected so that the overlapping part coincides with the punctured part of the previous transmission.

5. The method of claim 1, wherein, when the puncturing data and the punctured data have different characteristics, the selecting the RV comprises selecting the RV to maximize coding gain.

6. The method of claim 5, further comprising relying on the UE to detect the differences of the characteristics of the puncturing data and the punctured data.

7. A method performed by a User Equipment (UE) for detecting a damaged transmission of data due to data puncturing, the method comprising:
receiving, from a network node, a retransmission of data of a previous transmission transmitted to the UE by the network node, a Puncturing Indication (PI), and a Redundancy Version (RV) for the retransmission;
checking the PI to determine whether or not the data is punctured in the previous transmission of data; and
detecting the puncturing data based on the RV when the data is punctured in the previous transmission.

8. The method of claim 7, wherein the received RV is used in the retransmission.

9. The method of claim 8, further comprising removing soft-information for the detected puncturing data of the previous transmission from a soft-buffer, before further processing the retransmission.

10. The method of claim 7, further comprising:
checking the RV of the retransmission when the data is punctured in the previous transmission;
if the RV, in terms of bit positions, partially or fully overlaps with the RV used in the previous transmission, performing the detecting of the puncturing data by using a correlation in characteristics between the previous transmission and the retransmission; and
performing soft combining of soft information of the previous transmission and soft information of the retransmission.

11. The method of claim 7, further comprising:
checking the RV of the retransmission when the data is punctured in the previous transmission;
if the same RV is used in the retransmission as in the previous transmission, performing the detecting of the puncturing data by using a correlation in characteristics between the previous transmission and the retransmission; and
performing Chase combining of soft information of the previous transmission and soft information of the retransmission.

12. The method of claim 10, wherein the soft combining of soft information of the previous transmission and soft information of the retransmission is performed after the detected puncturing data is removed from a soft buffer.

13. The method of claim 7, further comprising:
checking the RV of the retransmission when the data is punctured in the previous transmission;
if a different RV is used in the retransmission compared to the previous transmission, performing the detecting of the puncturing data by using a difference in characteristics between the puncturing data and the punctured data in the previous transmission; and
performing soft combining of soft information of the previous transmission and soft information of the retransmission based on Incremental Redundancy (IR).

14. The method of claim 13, wherein the performing soft combining of soft information of the previous transmission and soft information of the retransmission is performed after the detected puncturing data is removed from a soft buffer.

15. The method of claim 7:
wherein the puncturing data and punctured data have different characteristics; and
wherein the detecting of the puncturing data is performed by detecting the differences of different characteristics of the puncturing data and the punctured data.

16. A network node for handling a damaged transmission of data due to data puncturing, the network node comprising:
processing circuitry; and
memory containing instructions executable by the processing circuitry whereby the network node is operative to:
receive, from a User Equipment (UE), a Negative Acknowledgment (NACK) feedback of a previous transmission of data transmitted to the UE;
check whether or not the data is punctured in the previous transmission corresponding to the NACK feedback;
when the data is punctured in the previous transmission, select a Redundancy Version (RV) for a retransmission of the data, according to characteristics of the punctured data and puncturing data; and
send a Puncturing Indication (PI), the selected RV, and the retransmission of the data to the UE.

17. A User Equipment (UE) for detecting a damaged transmission of data due to data puncturing, the UE comprising:
processing circuitry; and memory containing instructions executable by the processing circuitry whereby the UE is operative to:
- receive, from a network node, a retransmission of data of a previous transmission transmitted to the UE by the network node, a Puncturing Indication (PI), and a Redundancy Version (RV) for the retransmission;
- check the PI whether or not the data is punctured in the previous transmission of data; and
- detect the puncturing data based on the RV when the data is punctured in the previous transmission.

* * * * *